(12) United States Patent
Fader et al.

(10) Patent No.: US 6,530,586 B2
(45) Date of Patent: Mar. 11, 2003

(54) SUSPENSION TORSION BAR WITH VARIABLE RATE ADJUSTMENT ARMS

(75) Inventors: Joe Fader, Brighton, MI (US); Steve Yollick, Troy, MI (US); Mark Clements, Columbiaville, MI (US); Chris Keeney, Troy, MI (US); Jim Hawkins, Madison, AL (US)

(73) Assignee: Meritor Light Vehicle Systems LLC, Troy, MI (US)

( * ) Notice: Subject to any disclaimer, the term of this patent is extended or adjusted under 35 U.S.C. 154(b) by 24 days.

(21) Appl. No.: 09/804,743

(22) Filed: Mar. 13, 2001

(65) Prior Publication Data

US 2002/0130481 A1 Sep. 19, 2002

(51) Int. Cl.$^7$ ............................................. B60G 21/055
(52) U.S. Cl. ..................... 280/124.106; 280/124.107; 280/124.137; 280/124.149; 280/124.152; 280/124.166
(58) Field of Search ................... 280/124.137, 124.167, 280/124.149, 124.106, 5.506, 5.511, 124.166, 124.107, 124.152

(56) References Cited

U.S. PATENT DOCUMENTS

| | | | | |
|---|---|---|---|---|
| 3,086,793 A | * | 4/1963 | Kozicki | ........................ 280/104 |
| 3,386,751 A | * | 6/1968 | Allison | ........................ 267/273 |
| 4,094,532 A | | 6/1978 | Johnson et al. | |
| 4,641,856 A | * | 2/1987 | Reichenbach | ................ 267/217 |
| 4,989,713 A | * | 2/1991 | Janson | ........................ 192/208 |
| 5,288,101 A | * | 2/1994 | Minnett | ........................ 267/277 |
| 5,478,103 A | * | 12/1995 | Maeda et al. | ................. 267/273 |
| 5,641,175 A | * | 6/1997 | Maeda et al. | ................. 267/273 |
| 5,687,960 A | * | 11/1997 | Moon | ........................... 267/154 |
| 5,707,050 A | | 1/1998 | Pfundstein | |
| 5,839,741 A | * | 11/1998 | Heyring | ................ 280/124.106 |
| 5,882,017 A | * | 3/1999 | Carleer | ......................... 267/187 |
| 5,921,569 A | | 7/1999 | Noutomi et al. | |
| 6,099,006 A | * | 8/2000 | Sugiyama et al. | ..... 280/124.149 |
| 6,149,166 A | * | 11/2000 | Struss et al. | .................. 267/191 |
| 6,318,737 B1 | * | 11/2001 | Marechal et al. | ............ 267/277 |
| 6,357,771 B1 | * | 3/2002 | Clements et al. | ....... 280/124.13 |

* cited by examiner

Primary Examiner—Paul N. Dickson
Assistant Examiner—Deanna Draper
(74) Attorney, Agent, or Firm—Carlson, Gaskey & Olds

(57) ABSTRACT

A suspension system includes a damper assembly to provide an anti-roll capability to a vehicle torsion bar suspension system. The damper assembly is attached to each torsion bar. To selectively couple and decouple the rotational motion of the torsion bars. In one embodiment the damper assembly selectively links rotational motion of the torsion bar anchor arms to transfer an anti-roll force from one suspension link to the opposite suspension link.

14 Claims, 3 Drawing Sheets

SUSPENSION TORSION BAR WITH VARIABLE RATE ADJUSTMENT ARMS

BACKGROUND OF THE INVENTION

The present invention relates to a torsion bar assembly for a vehicle suspension system, and more particularly to a damper linked between a pair of the torsion bars to control vehicle roll.

Vehicles are commonly equipped with independent suspension systems which include a vibration or shock-absorbing device for absorbing road shock and other vibrations while providing a smooth and comfortable ride for the vehicle occupants. One type of shock absorbing system includes a torsion bar extending longitudinally along the length of the vehicle. One end of the torsion bar is connected to a suspension control arm while the other end is connected to the vehicle frame. The torsion bar twists with articulation of the suspension component to provide a torsional elastic resistance to the up/down or jounce/rebound movement of the suspension component. The torsion bar thereby acts as a spring to absorb vibrations from the road surface and provide particular handling qualities.

Vehicles are also commonly equipped with a stabilizer bar to increase the roll rigidity and improve the steering stability of the vehicle. Typically, the stabilizer bar is an elongated member oriented to extend laterally across the vehicle with a first and second segment extending longitudinally at each end of the central segment. The central segment of the stabilizer bar is supported for rotation about its own longitudinal axis by one or more mounting brackets which are fixed to the vehicle body or frame. Each longitudinal segment is attached to a suspension member such as a control arm of the suspension system by an end link.

When the vehicle is subjected to a lateral rolling force such as, for example, while the vehicle negotiates a turn, the longitudinal segments pivot in opposite directions with respect to the lateral axis of the central segment. As a result, torsional reaction forces are generated which act through the segments to urge the suspension members to move toward their normal position. Thus, the vehicle body will be prevented from excessive rolling or leaning to either side by the torsional resistance produced by the stabilizer bar.

Accordingly, it is desirable to provide a torsion bar suspension, which incorporates anti-roll features without the necessity of a separate stabilizer bar assembly. It is further desirable to selectively actuate the anti-roll features to provide a stiffened suspension when it is required, such as when cornering, while allowing a smooth ride when it is not required, such as during normal straight travelling.

SUMMARY OF THE INVENTION

The suspension system according to the present invention generally includes a damper assembly to provide an anti-roll capability to a vehicle torsion bar suspension system. A first and second torsion bar are respectively connected to a lower suspension link at one end. A first anchor arm is mounted to the first torsion bar and a second anchor arm is mounted to the second torsion bar. The anchor arms mount the torsion bars to a cross member of the vehicle frame.

The damper assembly is attached to each torsion bar to couple and decouple rotational motion of the torsion bars. By disengaging the damper assembly rotational motion of the torsion bars is decoupled and the torsion bars operated individually in a known manner.

The damper assembly is preferably in communication with a controller and a sensor. The sensor detects vehicle roll as the controller interprets the signals from the sensor to determine whether the damper assembly should be activated and to what degree. The activation of the damper assembly provided a roll control adjustment in response to relative movement of the suspension members.

In one embodiment the damper assembly selectively links rotational motion of the anchor arm through links. The links attach each torsion bar anchor arm to the damper assembly. By selectively linking rotational motion of the torsion bar the links and the damper assembly respond as a stabilizer bar to transfer an anti-roll force form one connecting lower suspension link to the opposite lower suspension link.

Because the torsion bar preferably absorbs impacts below a predetermined torsional force, the suspension system according to the present invention provides a smooth ride. However, when an undesirable amount of roll is detected, the damper assembly engages to stiffen the suspension system to resist roll. The anti-roll capability is thus provided when it is required, such as when cornering, while allowing a smooth ride when it is not required, such as during normal straight travelling.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
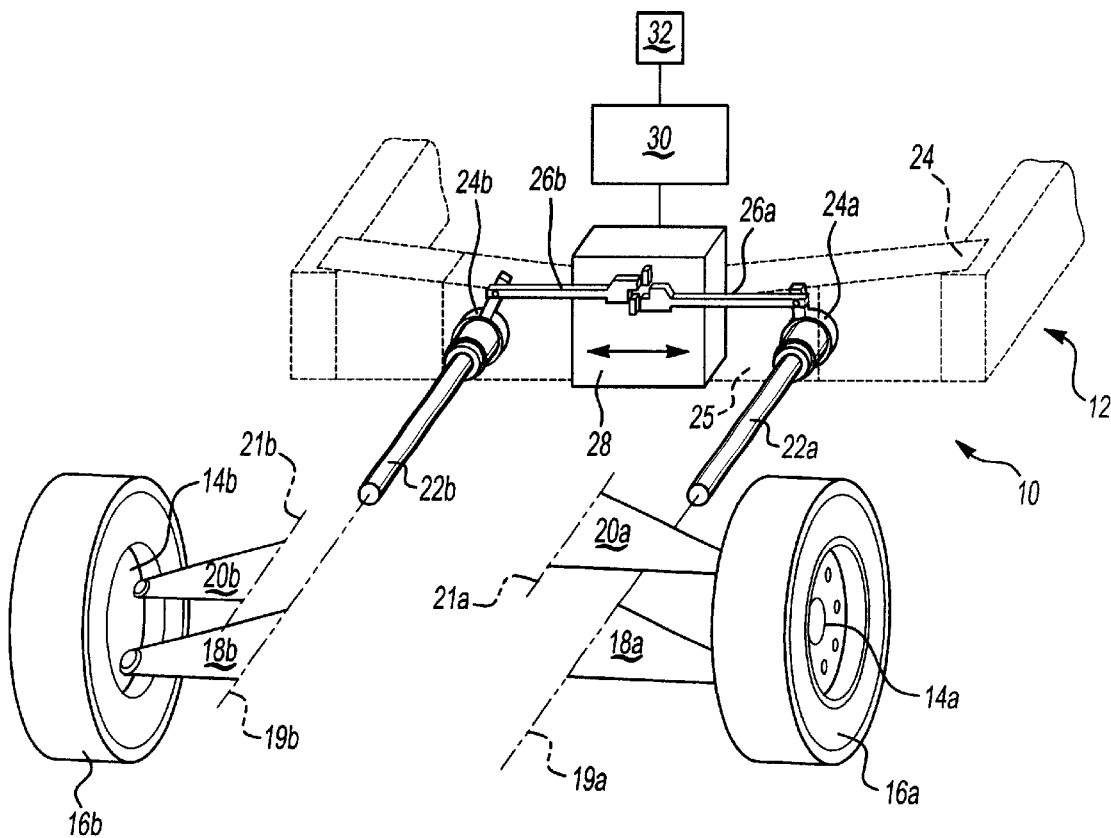
FIG. 1 is a partially schematic view of a vehicle suspension system according to the present invention.

FIG. 1 schematically illustrates a suspension system 10 for a vehicle 12. The system 10 generally includes independent axes 14A, 14B that support a wheel 16A, 16B on each side of the vehicle 12. The axes 14A, 14B are independently articulatable in an up/down direction via lower suspension link 18A, 18B and upper suspension link 20A, 20B. The lower suspension links 18A, 18B pivot about their respective axes 19A, 19B and the upper suspension links 20A, 20B pivot about axes 21A, 21B.

A first and second torsion bar 22A 22B are respectively connected to a lower link 18A, 18B. A first anchor arm 24A is mounted to the first torsion bar 22A and a second anchor arm 24B is mounted to the second torsion bar 22B. The anchor arms 24A, 24B mount the torsion bars 22A, 22B through a cross member 25 of the vehicle frame 24. In operation, the torsion bars 22A, 22B are attached to the lower suspension links 18A, 18B and twist along axes 19A, 19B in response to the articulation of their respective lower links 18 and the up/down movement of the axes 14A, 14B. In this way, the torsion bars 22A, 22B provide elastic resistance to the up/down articulation of the lower link 18. Preferably, a damper assembly (shown schematically at 28) is attached between each torsion bar 22A, 22B. A first link 26A extends from the first anchor arm 24A and a second link 26B extends from the second anchor arm 24B. The links 26A, 26B preferably extend from the anchor arms 24A, 24B toward the center of the cross member 25 to enter the damper assembly 28.

The damper assembly 28 provides for the selective coupling and decoupling of each link 26A, 26B. By proportionally coupling the links 26A, 26B rotational motion of the torsion bars 22A, 22B is more directly coupled. Conversely, by proportionally disengaging the links 26A, 26B, rotational motion of the torsion bars 22A, 22B is less directly coupled and the torsion bars operated individually in a known manner.

The damper assembly 28 is preferably in communication with a controller 30 and a sensor 32, shown schematically. The sensor 32 is located within the vehicle 12 to detect vehicle roll by interpretation, speed, distance moved, acceleration, or other data. The controller 30 interprets the signals from the sensor 32 and determines whether the damper assembly 28 should be activated and to what degree. Activation of the damper assembly 28 can be provided as an on/off or a slip-like manner in response to relative movement of the suspension members.

Figure 2A:
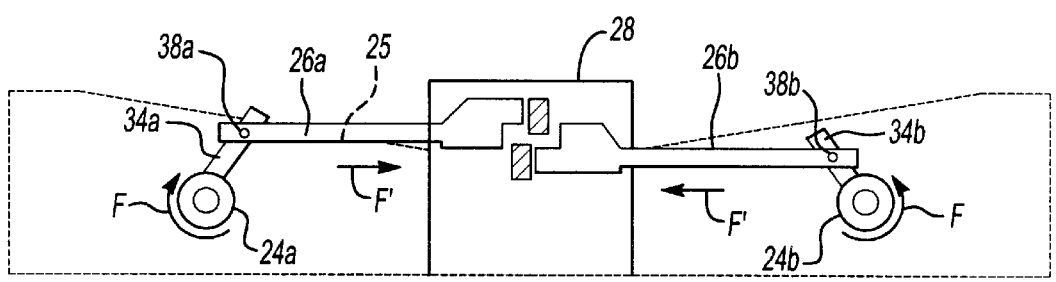
FIG. 2A is an expanded view facing forwardly of the vehicle suspension system of FIG. 1.

Referring to FIG. 2A, each anchor arm 24A, 24B includes a radially extending arm 34A, 34B. The arms 34A, 34B are preferably in line and are respectively pivotally connected to the first link 26A and the second link 26B at pivots 38A, 38B. Although the arms 34A, 34B are shown in parallel in the disclosed embodiment, it should be realized that other orientations can benefit from the present invention.

The damper assembly 28 receives each link 26A, 26B. In response to the controller 30 and sensor 32 (FIG. 1), the damper assembly 28 selectively links rotational motion of the anchor arm 24A, 24B through the links 26A, 26B. By selectively linking rotational motion of the torsion bar 22A, 22B, the links 26A, 26B and the damper assembly 28 respond as a stabilizer bar to transfer an anti-roll force form one lower suspension link 18A to the opposite lower suspension link 18B (FIG. 1).

Figure 2B:
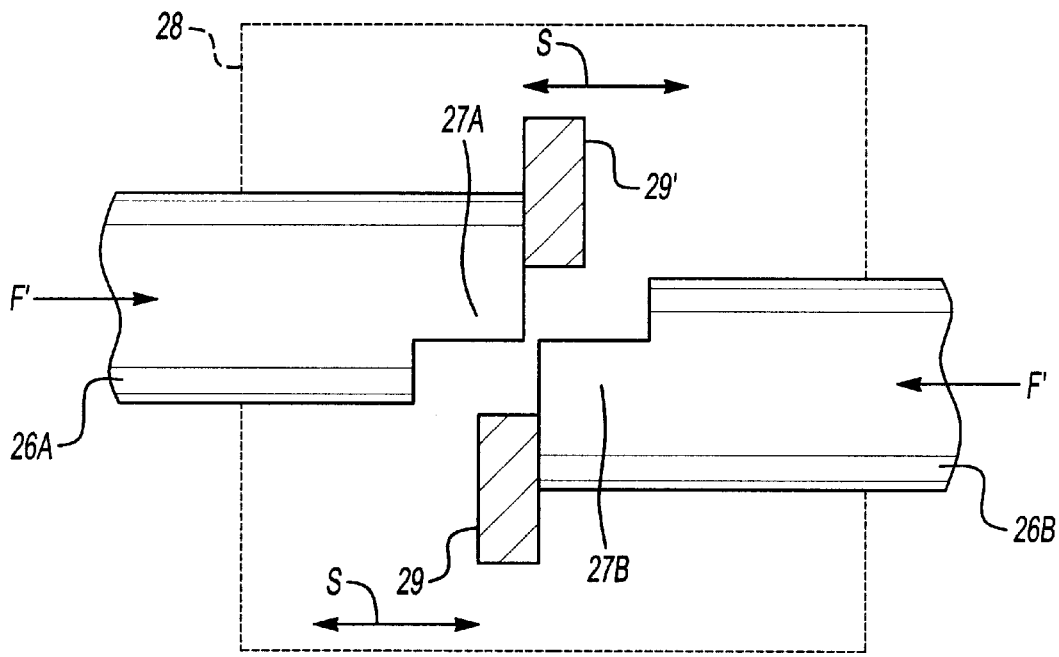
FIG. 2B is an expanded view of one embodiment of a damper assembly according to the present invention in an uncoupled condition.

Referring to FIG. 2B, an expanded view of the damper assembly 28 and each link 26A, 26B is illustrated. As the torsion bars 22A, 22B (FIG. 1) receive torsion forces from the suspension links 18A, 18B, the torsion forces (arrow F in FIG. 2A) are applied to the anchor arms 24A, 24B. The anchor arms 24A, 24B transfer the rotational torsional force into a linear force (arrow F') along the links 26A, 26B and into the damper assembly 28. It should be understood that the damper assembly 28 and steps 29 are illustrated schematically to indicate functional relationships.

Figure 2C:
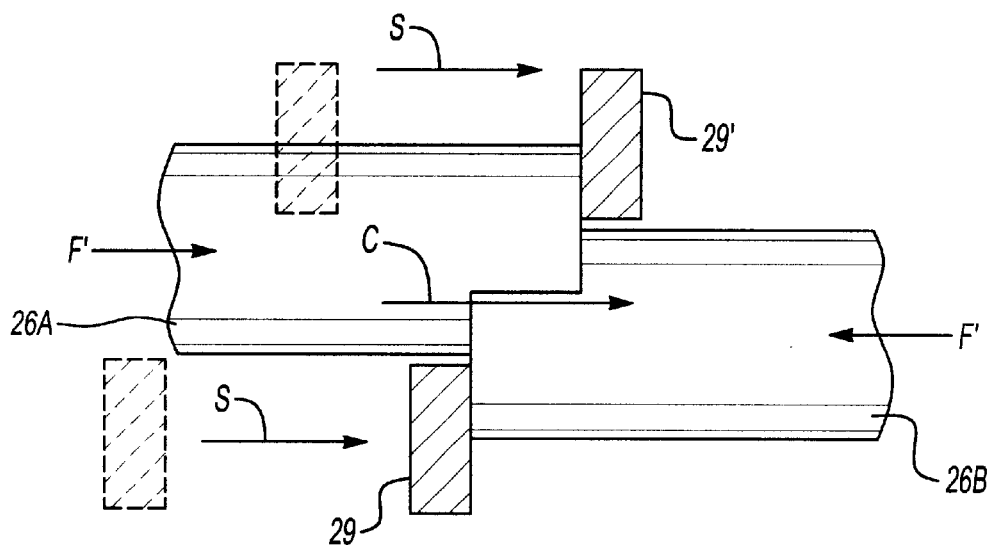
FIG. 2C is an expanded view of the damper assembly of FIG. 2B in a coupled condition.

Referring to FIG. 2C, an expanded view of the damper assembly 28 and each link 26A, 26B end 27A, 27B is illustrated. The link ends 27A, 27B include complimentary step-like arrangements separated by movable stops 29. The link ends 27A, 27B engage the stops 29 such that linear force F' from each link 26A, 26B is restrained by the stops 29. When fixed by the stops 29, the anchor arms 24A, 24B and the torsion bars 22A, 22B operate as an individual spring for the suspension links in a known manner.

Although a step arrangement at each link end 27A, 27B is illustrated in the disclosed embodiment, other arrangements such as ramps, active engagement, clutches, or other proportionally engageable arrangements are applicable to the present invention. By providing proportional engagement the damper assembly 28 will transfer only a percentage of the rotational force from one torsion bar 22A, 22B, to the other. The anti-roll function is thus provided when it is required, such as when cornering, while allowing a smooth ride when it is not required, such as during normal straight travelling.

Figure 3:
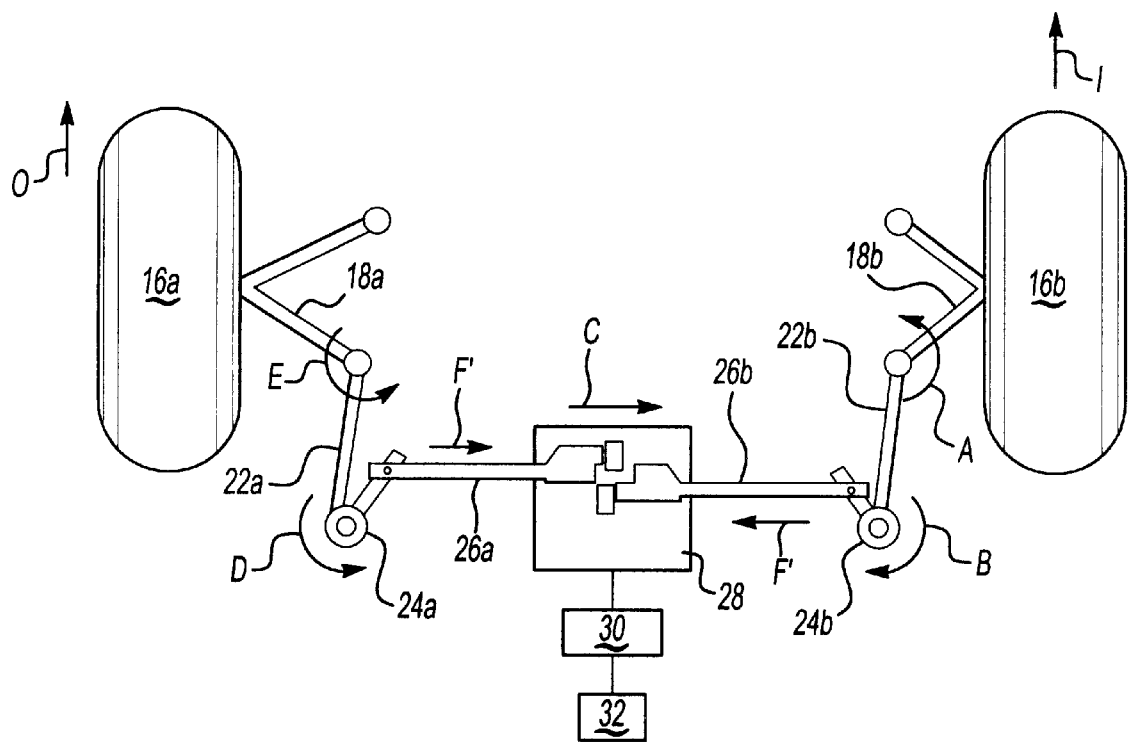
FIG. 3 is an exemplary schematic representation of the vehicle suspension system of FIG. 1 illustrating anti-roll response characteristics according to the present invention.

In response to the controller 30 and sensor 32 (FIG. 1), the damper assembly 28 selectively moves the stops in a direction to compensate for vehicle roll such that link ends 27A, 27B are engaged (FIG. 2C) with each other. Resistance to the linear force F' along each link 26A, 26B is now provided by the opposite link 26B, 26A. Any force thereby exerted on one torsion bar 22A, 22B (due to vehicle roll) is thereby resisted and transferred to the other torsion bar 22B, 22A through the connected links 26A, 26B. Rotational motion of one torsion bar 22A, 22B, is thereby transferred as an opposite rotational force to the other torsion bar 22B, 22A. An anti-roll function is thereby provided as will be further described below. Further, the controller 30 individually moves a direction appropriate to compensate for vehicle roll. As illustrated in FIG. 2C, stops 29 are moved toward torsion bar 22B (as illustrated by arrow C) such that the torsional force within torsion bars 22A, 22B is shifted from the center. In other words, torsion bar 22B is "wound-up" while torsion within torsion bar 22A is relieved (FIG. 3). After the force (hard turn) has been stopped, the links 26A, 26B are returned to their neutral positions (FIG. 2B) and the stops 29 are relocated to again provide operation of the torsion bars 22A, 22B in a known manner.

Referring to FIG. 3, operation of the suspension system is schematically illustrated. For example only, when a wheel 16B encounters an upward force (represented by arrow I), such as from a hard turn (right roll illustrated in FIG. 3), the first lower suspension link 18B rotates in the direction of arrow A. The first lower suspension link 18B is connected to the first anchor arm 24B through a first torsion bar 22B. Rotation (arrow A) of the first lower suspension link 18B is thereby transferred to the anchor arm 24B which resists rotation in the direction of arrow B. Torsion bar 22B is thereby "wound-up."

The upward force (arrow I) is sensed by the sensor (schematically represented at 32) which is in communication with the controller (schematically represented at 30). In response, the controller 30 selectively couples the rotational motion of the first anchor arm 24B to the second anchor arm 24A by activating the damper assembly 28 to selectively couple the first link 26B with the second link 26A. The first and second link 26A, 26B thus work against each other (F' in FIG. 2C). Force applied by damper assembly 28 under control of controller 30 causes rotation of the first anchor arm 24B in a direction of arrow B. Torsion bar 22B is thereby "wound-up" and subtracted from the second anchor arm 24A (as represented by arrow C). As the anchor arms 24B, 24A are parallel, the second anchor arm 24A parallel is rotated in the same direction as the first anchor arm 24B as represented by arrow D thereby relieving the torsional bar 22A.

Rotation of the second anchor arm 24A (arrow D) is transferred to the second lower suspension link 18A through the second torsion bar 22A. The rotational force of the second anchor arm 24A (arrow D) creates a rotation force (arrow E) which relieves the torsion bar torque action upon the second lower suspension link 18A and allows the vehicle weight to depress vehicle wheel 16A in an upward direction as represented by arrow O. Notably, the upward force (arrow O) is in the same direction as the original applied force (arrow I). By selectively coupling the links 26B, 26A (FIG. 2C) the damper assembly 28 provides a selectively actuated anti-roll force.

If, however, the upward force I does not exceed a predetermined force, the controller 30 will not activate the damper assembly 28 (FIG. 2B) and the first link 26B would not effect the second link 26A. The first torsion bar 22B will rotate independently of the second torsion bar 22A and the first wheel 16B will respond as a known torsion bar wheel assembly.

While the particular disclosed arrangement uses a links or cables, other coupling members could be substituted. The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A suspension system for a vehicle comprising:

a first and a second suspension member;

a first torsion bar attached to said first suspension member;

a second torsion bar attached to said second suspension member; and a damper assembly attached to said first and said second torsion bar to selectively couple rotational motion of said first and second torsion bar in response to a predetermined movement of one of said first and second suspension members, said damper assembly comprising a first and a second movable stop, said first stop selectively engageable with a first link extending from said first torsion bar and said second stop selectively engageable with a second link extending from said second torsion bar, said first and said second movable stop movable to selectively permit or prevent engagement between said first link and said second link.

2. The suspension system as recited in claim 1, wherein said damper assembly rotates said first torsion bar in a first direction in response to rotation of said second torsion bar in a second direction.

3. The suspension system as recited in claim 1, further comprising a first anchor arm attached to said first torsion bar and a second anchor arm attached to said second torsion bar.

4. The suspension system as recited in claim 1, further comprising a first link extending from said first anchor arm and a second link extending from said second anchor arm, said first and second links selectively engageable by said damper assembly.

5. The suspension system as recited in claim 1, further comprising a sensor operable to sense a quantity indicative of a force encountered by at least one of said first and second suspension members.

6. The suspension system as recited in claim 5, further comprising a controller in communication with said sensor and said damper assembly, said controller operable to activate said damper assembly in response to said sensor to achieve or prevent relative rotation between said first and second torsion bars.

7. The suspension system as recited in claim 1, further comprising a first anchor arm attached to said first link and said first torsion bar and a second anchor arm attached to said second link and said second torsion bar.

8. The suspension system as recited in claim 1, wherein said first and said second movable stop are linearly movable.

9. The suspension system as recited in claim 1, wherein said first and said second movable stop are linearly movable generally along a length of said first and said second link.

10. The suspension system as recited in claim 1, wherein said first and said second movable stop are linearly movable to shift a neutral position of said first and said second link.

11. A suspension system for a vehicle comprising:

a first and a second suspension member;

a first torsion bar attached to said first suspension member and to a first anchor arm;

a second torsion bar attached to said second suspension member and to a second anchor arm;

a first link attached to said first anchor arm;

a second link attached to said second anchor arm; and a damper assembly engageable with said first link and said second link to selectively couple rotational motion of said first and second torsion bar in response to a predetermined movement of one of said first and second suspension members.

12. The suspension system as recited in claim 11, wherein said damper assembly includes a first and a second movable stop, said first stop selectively engageable with said first link and said second stop selectively engageable with said second link.

13. The suspension system s recited in claim 12, wherein said movable stops are disengagable form said first link and said second link such that said first link engages said second link, said first torsion bar rotatable in a first direction in response to rotation of said second torsion bar in a second direction.

14. A suspension system for a vehicle comprsing:

a first and a second suspension member;

a first torsion bar attached to said first suspension member;

a second torsion bar attached to said second suspension member;

a damper assembly attached to said first and said second torsion bar to selectively couple rotational motion of said first and second torsion bar in response to a predetermined movement of one of said first and second suspension members;

a sensor operable to sense a quantity indicative of a force encountered by at least one of said first and second suspension members; and a controller in communication with said sensor and said damper assembly, said controller operable to activate said damper assembly in response to said sensor to achieve or prevent relative rotation between said first and second torsion bars.

* * * * *

UNITED STATES PATENT AND TRADEMARK OFFICE
CERTIFICATE OF CORRECTION

PATENT NO.    : 6,530,586 B2
DATED         : March 11, 2003
INVENTOR(S)   : Fader et al.

It is certified that error appears in the above-identified patent and that said Letters Patent is hereby corrected as shown below:

Column 5,
Line 39, "bar," should be -- bar, with --.

Column 6,
Lines 8, 10 and 13, "stop" should be -- stops --.
Line 36, "form" should be -- from --.

Signed and Sealed this

Sixth Day of May, 2003

JAMES E. ROGAN
*Director of the United States Patent and Trademark Office*